(12) United States Patent
Holden

(10) Patent No.: US 9,548,991 B1
(45) Date of Patent: Jan. 17, 2017

(54) PREVENTING APPLICATION-LEVEL DENIAL-OF-SERVICE IN A MULTI-TENANT SYSTEM USING PARAMETRIC-SENSITIVE TRANSACTION WEIGHTING

(71) Applicant: International Business Machines Corporation, Armonk, NY (US)

(72) Inventor: Russell L. Holden, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/982,756

(22) Filed: Dec. 29, 2015

(51) Int. Cl.
*H04L 29/00* (2006.01)
*H04L 29/06* (2006.01)

(52) U.S. Cl.
CPC ....... *H04L 63/1416* (2013.01); *H04L 63/1425* (2013.01)

(58) Field of Classification Search
CPC .......................... H04L 63/1425; H04L 63/1458
See application file for complete search history.

(56) References Cited

U.S. PATENT DOCUMENTS

| | | | |
|---|---|---|---|
| 7,681,235 | B2 | 3/2010 | Chesla et al. |
| 8,271,422 | B2 | 9/2012 | Wright et al. |
| 8,468,244 | B2 | 6/2013 | Redlich et al. |
| 8,635,351 | B2 * | 1/2014 | Astete ........................... 709/215 |
| 8,806,629 | B1 | 8/2014 | Cherepov et al. |
| 2002/0129123 | A1 * | 9/2002 | Johnson .............. H04L 65/4084 709/219 |
| 2010/0131351 | A1 * | 5/2010 | Kazan .................... G06Q 30/02 705/14.42 |
| 2011/0083179 | A1 * | 4/2011 | Lawson .............. H04L 63/1458 726/22 |
| 2013/0013738 | A1 * | 1/2013 | Astete ................. G06F 9/45533 709/217 |
| 2013/0074181 | A1 | 3/2013 | Singh |

(Continued)

OTHER PUBLICATIONS

IBM, "Method to manage reservation and allocation of scarce resources shared by tenants in a massively multi-tenant environment," IPCOM000188508D, Oct. 12, 2009.

(Continued)

*Primary Examiner* — Izunna Okeke
*Assistant Examiner* — Ali Shayanfar
(74) *Attorney, Agent, or Firm* — Anthony England; David H. Judson

(57) ABSTRACT

Denial-of-service attacks are prevented or mitigated in a cloud compute environment, such as a multi-tenant, collaborative SaaS system. This is achieved by providing a mechanism by which characterization of "legitimate" behavior is defined for accessor classes, preferably along with actions to be taken in the event an accessor exceeds those limits. A set of accessor "usage profiles" are generated. Typically, a profile comprises information, such as one or more "constraints," and one or more "actions." At least one constraint is generated by applying one or more parameters of a transaction weighting function such that the resulting constraint represents an actual or estimated cost of executing the transaction. An action defines how the system will respond if a particular constraint is triggered. By applying the constraints to accessor requests, the approach prevents overutilization of compute resources.

17 Claims, 5 Drawing Sheets

(56) References Cited

U.S. PATENT DOCUMENTS

| | | | | |
|---|---|---|---|---|
| 2014/0075032 A1* | 3/2014 | Vasudevan | ............ | G06F 9/5072 709/226 |
| 2014/0181978 A1 | 6/2014 | Bu et al. | | |
| 2014/0379924 A1* | 12/2014 | Das | ......................... | H04L 47/72 709/226 |
| 2015/0046279 A1* | 2/2015 | Wang | ..................... | G06F 9/5027 705/26.3 |
| 2015/0120791 A1* | 4/2015 | Gummaraju | ...... | G06F 17/30194 707/823 |
| 2015/0178135 A1* | 6/2015 | Wang | ..................... | G06F 9/5027 718/104 |
| 2015/0277791 A1* | 10/2015 | Li | ......................... | G06F 3/0619 711/114 |
| 2016/0057076 A1* | 2/2016 | Zlati | ..................... | H04L 47/783 709/201 |
| 2016/0119246 A1* | 4/2016 | Wang | ...................... | H04L 47/72 709/226 |

OTHER PUBLICATIONS

Anonymous, "Apparatus and Method of Tenant Context Generation and Propagation in SaaS Environment," IPCOM000198980D, Aug. 19, 2010.

Anonymous, "A method of providing SSO service between on-premise application and public cloud service," IPCOM000220208D, Jul. 25, 2012.

Buchegger et al., "Nodes bearing grudges: Towards routing security, fairness, and robustness in mobile ad hoc networks," Parallel, Distributed and Network-based Processing, 2002. Proceedings. 10th Euromicro Workshop on Parallel, Distributed and Network-based Processing (EUROMICRO-PD☆02), IEEE, 2002.

Choi et al., "Botnet detection by monitoring group activities in DNS traffic," Computer and Information Technology, 2007. CIT 2007. 7th IEEE International Conference on Computer and Information Technology, IEEE, 2007.

Li-Qin et al."Evaluation of user behavior trust in cloud computing." Computer Application and System Modeling (ICCASM), 2010 International Conference on Computer Application and System Modeling (ICCASM 2010), vol. 7. IEEE, 2010.

Wei et al, "An Early Stage Detecting Method against SYN Flooding Attack," Computer Science and its Applications, 2008. CSA'08. International Symposium on Computer Science and its Applications, IEEE, 2008.

\* cited by examiner

PREVENTING APPLICATION-LEVEL DENIAL-OF-SERVICE IN A MULTI-TENANT SYSTEM USING PARAMETRIC-SENSITIVE TRANSACTION WEIGHTING

BACKGROUND OF THE INVENTION

Technical Field

This disclosure relates generally to securing information in a cloud computing or other shared deployment environment wherein disparate parties share Information Technology (IT) resources.

Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. Cloud compute resources are typically housed in large server farms that run networked applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines. The different components may run on different subdomains in different physical cages in different data centers in different parts of the world, all running on different hardware with different proxy/gateway/session management capabilities and different back-end technologies.

Multiple entities (or "tenants") share the infrastructure. With this approach, a tenant's application instance is hosted and made available "as-a-service" from Internet-based resources that are accessible, e.g., through a conventional Web browser over HTTP. A cloud compute environment, such as IBM SmartCloud® for Social Business (formerly known as LotusLive®), presents to the user as a single unified experience; in operation, the end user logs-in once against a centralized authentication component, and then transparently signs-on (e.g., via SAML (Security Assertion Markup Language)-based authentication and authorization techniques) into different components of the service.

Multi-tenant, collaborative SaaS (Software-As-A-Service) systems such as IBM SmartCloud® for Social Business often provide a number of different interfaces for customers. These might include: proprietary protocol-based installed end-user applications, browser-based end-user applications, mobile device servers (e.g., IBM Lotus Traveler Server) within the SaaS environment, mobile device servers outside the SaaS environment and typically used for individual customers, commercial third party products used by customers to access the SaaS system and hosted by customers, and customer applications accessing the SaaS system. This large variety of "accessors" to the cloud infrastructure complicates the service provider's ability to track usage within its shared infrastructure. Indeed, even within the "known" applications provider by the SaaS provider, there may be many sub-modes of usage. For example, routine end-user access patterns might differ substantially from actions taken by those applications to synchronize or replicate data to enable off-line usage of the application. Also, bugs occurring (e.g., especially in server-based accessors) may result in unintentional denial-of-service attacks on cloud resources, thereby inhibiting or undermining legitimate utilization of cloud resources.

BRIEF SUMMARY

This disclosure provides for a method of preventing application-level denial-of-service with respect to compute resources in a multi-tenant shared infrastructure. A set of tenant applications available in the multi-tenant shared infrastructure are accessible by one or more accessors. The method begins upon receipt from an accessor of a request to access a given application in the multi-tenant shared infrastructure. In response, a given usage profile is selected from a set of usage profiles. The given usage profile includes a usage constraint that, for a given transaction identified in the usage constraint, has an associated parametric weighting. The usage constraint in the selected usage profile is then applied to determine whether the request to access the given application should proceed. Further, a given action is taken when permitting the request to access triggers the usage constraint in the selected usage profile.

Preferably, a given transaction defined as a constraint in a profile has an associated "weight." Typically, a weight comprises a positive integer value. Further, a given transaction weight is "parameterized" by one or more parameters using a "weighting function." The weighting function is a formula having variables that correspond to the one or more parameters. Typically, there is a weighting formula corresponding to a given transaction or transaction type. Depending on the parameter values, a given weighting function associated with a transaction weight evaluates to a value that then is applied as a positive or negative adjustment to the transaction weight. The result is a "parametric-sensitive transaction weighting." In this approach, the constraints in a usage profile comprise one or more transactions, with at least one of the transactions being weighted according to a weighting function defined by one or more parameters. When the usage profile includes multiple parametric-sensitive transaction weightings, the transaction weights (one or more of which are adjusted by their associated parameters through the weighting formula) are summed to provide an overall usage constraint.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
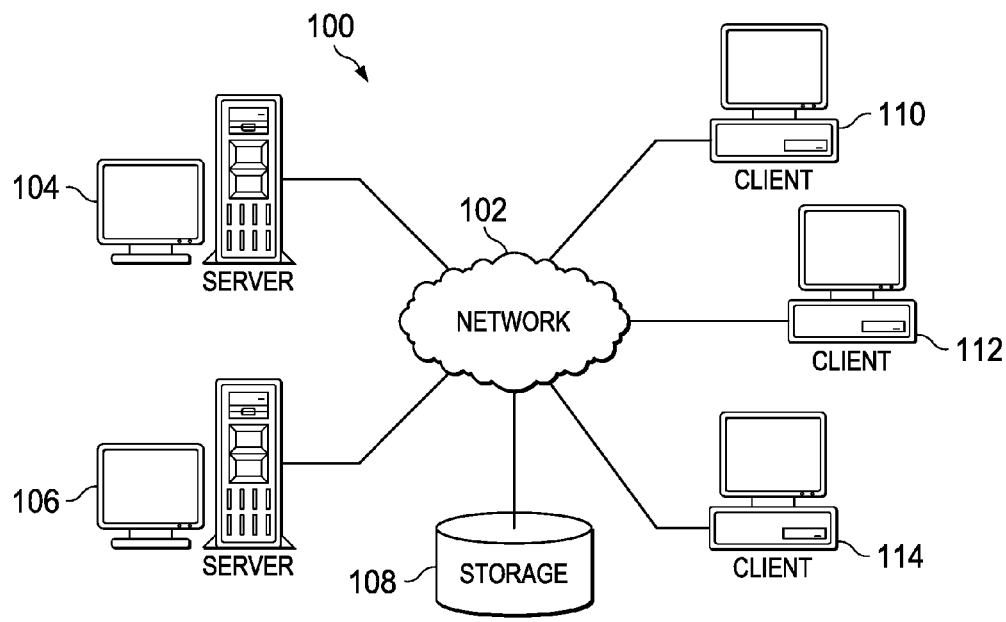
FIG. 1 depicts an exemplary block diagram of a distributed data processing environment in which exemplary aspects of the illustrative embodiments may be implemented.
Figure 2:
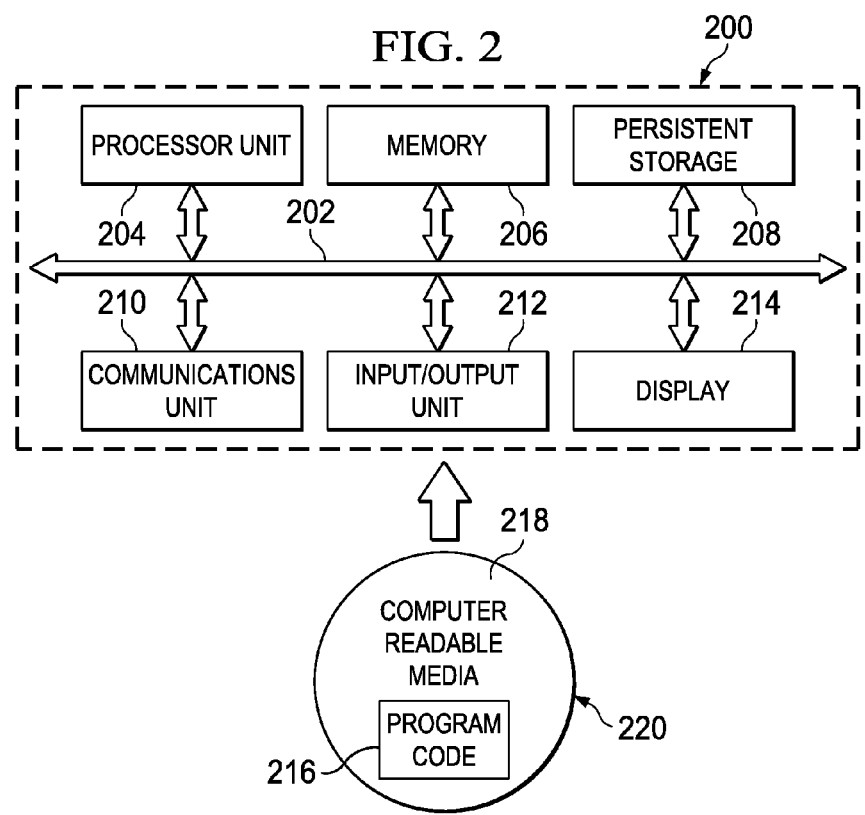
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the subject matter.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the disclosed subject matter may be written in any combination of one or more programming languages, including an object-oriented programming language such as Java™, Smalltalk, C++, C#, Objective-C, or the like, and conventional procedural programming languages. Program code may be written in interpreted languages, such as Python. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The techniques herein may also be implemented in non-traditional IP networks.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

By way of additional background, as used herein an "assertion" provides indirect evidence of some action. Assertions may provide indirect evidence of identity, authentication, attributes, authorization decisions, or other information and/or operations. An authentication assertion provides indirect evidence of authentication by an entity that is not the authentication service but that listened to the authentication service. As is known in the art, a Security Assertion Markup Language (SAML) assertion is an example of a possible assertion format that may be used with the present invention. SAML has been promulgated by the Organization for the Advancement of Structured Information Standards (OASIS), which is a non-profit, global consortium. SAML is described in "Assertions and Protocol for the OASIS Security Assertion Markup Language (SAML)", Committee Specification 01, May 31, 2002, as follows.

The Security Assertion Markup Language (SAML) is an XML-based framework for exchanging security information. This security information is expressed in the form of assertions about subjects, where a subject is an entity (either human or computer) that has an identity in some security domain. A typical example of a subject is a person, identified by his or her email address in a particular Internet DNS domain. Assertions can convey information about authentication acts performed by subjects, attributes of subjects, and authorization decisions about whether subjects are allowed to access certain resources. Assertions are represented as XML constructs and have a nested structure, whereby a single assertion might contain several different internal statements about authentication, authorization, and attributes. Note that assertions containing authentication statements merely describe acts of authentication that happened previously. Assertions are issued by SAML authorities, namely, authentication authorities, attribute authorities, and policy decision points. SAML defines a protocol by which clients can request assertions from SAML authorities and get a response from them. This protocol, consisting of XML-based request and response message formats, can be bound to many different underlying communications and transport protocols; SAML currently defines one binding, to SOAP over HTTP. SAML authorities can use various sources of information, such as external policy stores and assertions that were received as input in requests, in creating their responses. Thus, while clients always consume assertions, SAML authorities can be both producers and consumers of assertions.

The SAML specification states that an assertion is a package of information that supplies one or more statements made by an issuer. SAML allows issuers to make three different kinds of assertion statements: authentication, in which the specified subject was authenticated by a particular means at a particular time; authorization, in which a request to allow the specified subject to access the specified resource has been granted or denied; and attribute, in which the specified subject is associated with the supplied attributes.

Authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map. It should be noted that a user is typically, but not necessarily, a natural person; a user could be a machine, computing device, or other type of data processing system that uses a computational resource. It should also be noted that a user typically but not necessarily possesses a single unique identifier; in some scenarios, multiple unique identifiers may be associated with a single user.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, and so forth. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

Cloud Computing Model

It is to be understood that although this disclosure includes a detailed description on cloud computing, implementation of the teachings recited herein are not limited to a cloud computing environment. Rather, embodiments of the disclosed subject matter are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party, and it may be on-premises or off-premises.

Community cloud: the cloud infrastructure is shared by several organizations and supports a specific community that has shared concerns (e.g., mission, security requirements, policy, and compliance considerations). It may be managed by the organizations or a third party and may be on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
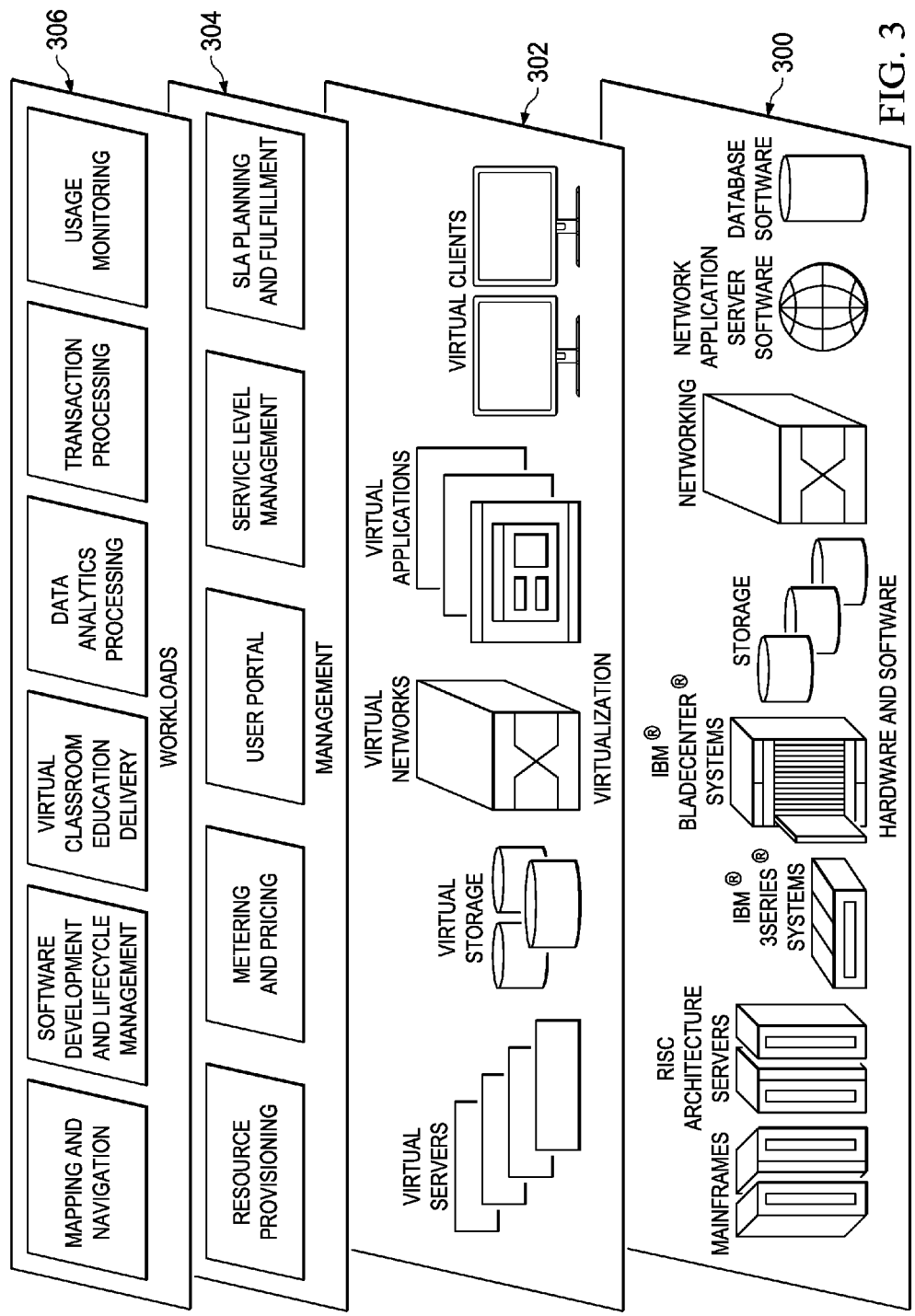
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and, according to this disclosure, a denial-of-service attack prevention mechanism.

It is understood in advance that although this disclosure includes a detailed description on cloud computing, implementation of the teachings recited herein are not limited to a cloud computing environment. Rather, embodiments of the disclosed subject matter are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

By way of example only, a representative enterprise application deployed in the cloud is a client-server application such as IBM® SmartCloud® for Social Business (formerly LotusLive), which provides a cloud-delivered suite of technologies that combine web conferencing, messaging, and collaboration services with social networking capabilities in an easy-to-use web-based environment. As a component of IBM® SmartCloud, Notes® provides a full-featured email, calendaring, contact management, and instant messaging. A user can access the service directly over the Internet in a number of ways, such as using a web browser, or a "rich" client application (such as the Notes rich client). Using this service, an enterprise places in the cloud service its email, calendar and/or collaboration infrastructure, and a user uses the Notes client to access his or her email, perform a calendar operation, or facilitate an online collaboration. In a representative embodiment, the Notes rich client is Version 8.5.2 or higher.

The above example (using IBM SmartCloud) is merely representative. The techniques described below are not limited for use with a particular enterprise application deployed within the cloud environment.

Figure 4:
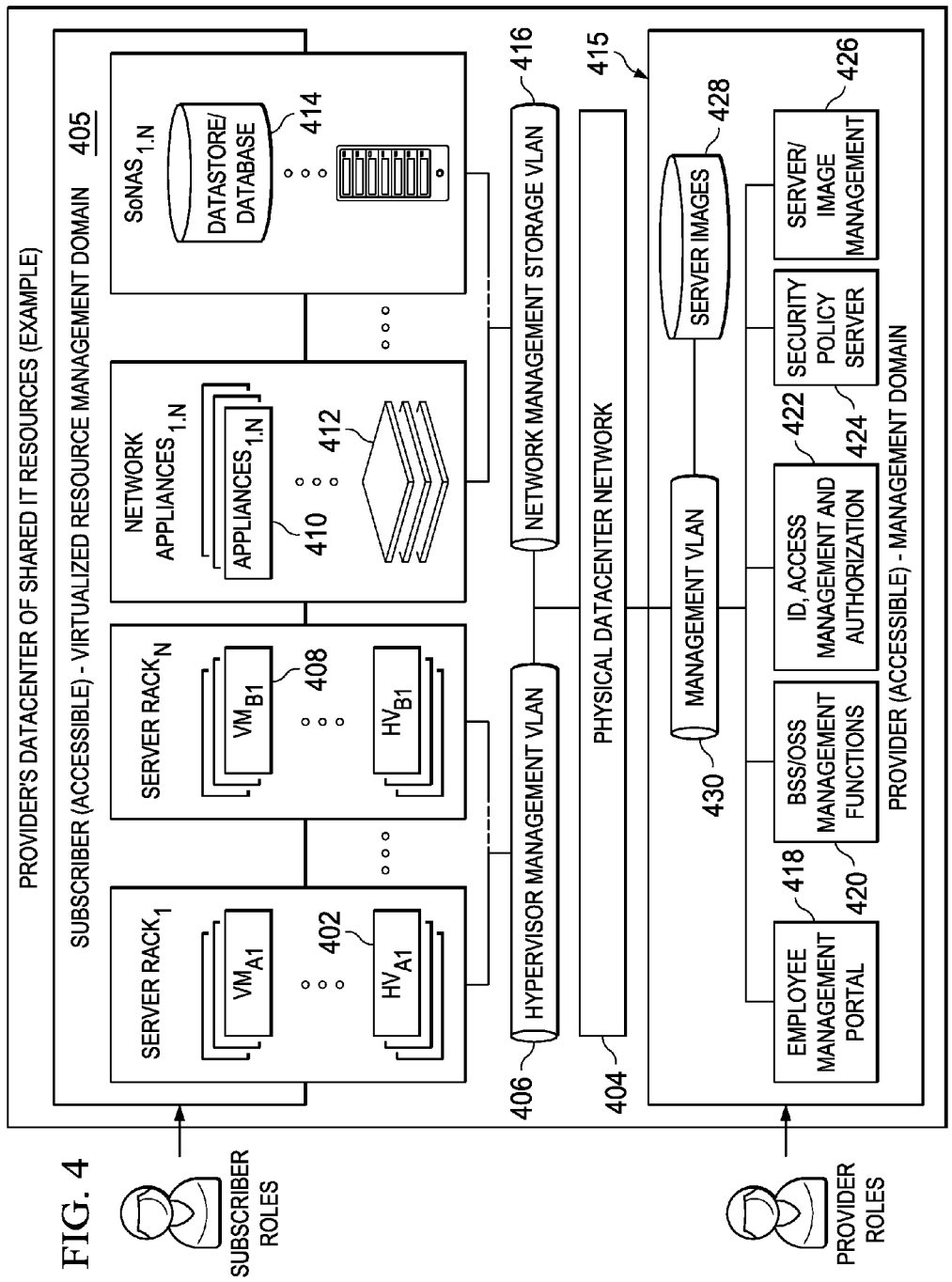
FIG. 4 illustrates an exemplary datacenter in which the denial-of-service attack prevention mechanism of this disclosure may be implemented.

FIG. 4 illustrates a typical IT infrastructure that supports virtualization of resources. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 4, an example virtual machine hosting environment (alternately referred to herein as a data center or "cloud") is illustrated. This environment comprises host machines (HVs) 402 (e.g., servers or like physical machine computing devices) connected to a physical datacenter network 404, typically via a hypervisor management VLAN 406. Although not depicted explicitly, typically the environment also includes load balancers, network data switches (e.g., top-of-rack switches), firewalls, and the like. As shown in FIG. 4, physical servers 402 are each adapted to dynamically provide one or more virtual machines (VMs) 408 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 410 are hosted in network appliances 412, and tenant data is stored in data stores and databases 414. The applications and data stores are connected to the physical datacenter network 404, typically via a network management/storage VLAN 416. Collectively, the virtual machines, applications and tenant data represent a subscriber-accessible virtualized resource management domain 405. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 415. This domain comprises a provider employee management portal 418, the BSS/OSS management functions 420, various identity and access management functions 422, a security policy server 424, and management functions 426 to manage the server images 428. These functions interface to the physical datacenter network via a management VLAN 430. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Multiple tenants share the infrastructure in a multi-tenant, collaborative SaaS system.

An "accessor" is an entity (a cloud customer or prospect, an end-user of the cloud customer, or a third party entity or end-user) that desires access to use a cloud resource.

An important consideration in such a shared multi-tenant environment is the consideration that some accessor patterns may be allowed only if an explicit commercial arrangement has been made with the cloud service provider (to use the applicable cloud resources). In the collaborative software market, there are thousands of third party add-on products that can be used with an application hosted in the cloud as-a-service. In some case companies moving to the SaaS model may require and be able to contract for the continuing use of those products; in many cases, those products may be providing a service for hundreds of thousands of downstream end-users, thereby requiring substantial resources from the SaaS vendor.

Although accessors in SaaS environments typically are known and registered entities (i.e., entities that have contracted for the service and whose identities are known to the service), quasi-anonymous access (e.g., self-service trials) may also allow usage by intentional abusers.

A denial-of-service attack in a shared tenant infrastructure such as described can have serious consequences. It may prevent legitimate users and usage of the service from continuing with acceptable response time and transaction throughput rates. Such attacks can lead to rejection of service for legitimate users and thereby create business-impacting support situations.

As will now be described, herein disclosed are ways to provide denial-of-service attack prevention or mitigation in a shared, multi-tenant SaaS environment.

Preventing Application-Level Denial-of-Service Attacks

Figure 5:
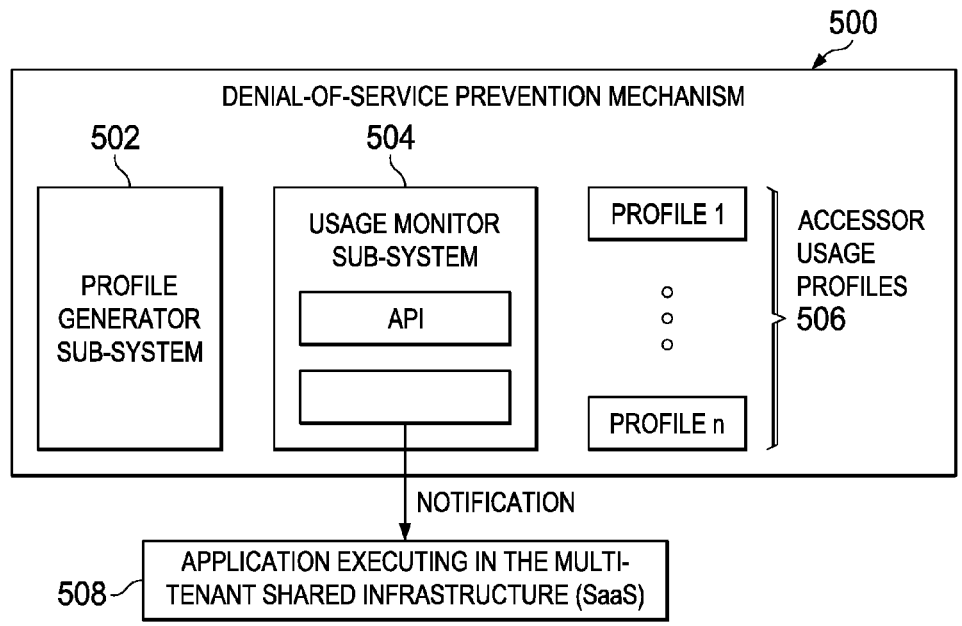
FIG. 5 illustrates a high-level block diagram of the basic components of the denial-of-service attack mechanism of this disclosure.

As illustrated in FIG. 5, a denial-of-service mechanism 500 includes two (2) primary sub-systems, a profile generator sub-system (or "profile generator") 502, and a usage monitor sub-system (or "usage monitor") 504. In general, the profile generator 502 is a tool by which a set of accessor usage profiles 506 are defined and stored for use by the usage monitor. Usage monitor 504 is the mechanism that receives the usage profiles and, as cloud resources are accessed and/or used, provides notifications (e.g., to the hosted applications, to management systems, or both) that one or more of the constraints defined therein are implicated.

In one embodiment, as described in more detail below, usage monitor 504 comprises a set of application programming interfaces (APIs) 510 that allow applications, such as application 508, to provide usage information and to respond with directions to the application about one or more actions to take in response to accessor requests. The applications typically represent the tenant applications being hosted in the cloud infrastructure, although this is not a limitation. When an application 508 receives a notification from the usage monitor that a constraint in a profile has been fired, the application can take a specified action, e.g., generate a warning, constrain access, restrict access, suspend the accessor, or the like. As multiple applications using the approach (in the aggregate) then operate concurrently (typically independently), the result is that no one accessor ends up obtaining access to sufficient cloud resources in such a manner that a denial-of-service can take place.

As used herein, a "denial-of-service" should be broadly construed to refer to any degradation of a tenant's service to a point below an acceptable response time and/or transaction throughput rate, whether or not the attack leads to a full rejection of service for legitimate users. A denial-of-service may occur deliberately, namely, as a result of an intentional act, or it may occur without direct intention on the part of the accessor(s) whose activity creates the situation.

Without limitation, the profile generator may be implemented as a web-based configuration tool and a set of back-end management processes. The functions in the profile generator 502 and usage monitor 504 sub-systems may be shared or common, local or remote, and accessible over a network, typically via a secure link. There may be one or executing instances of the profile generator and the usage monitor depending on implementation and workload. When multiple instances are executed, additional hardware and software support (e.g., load balancing, name servers, back-end databases, etc.) may be used.

Figure 6:
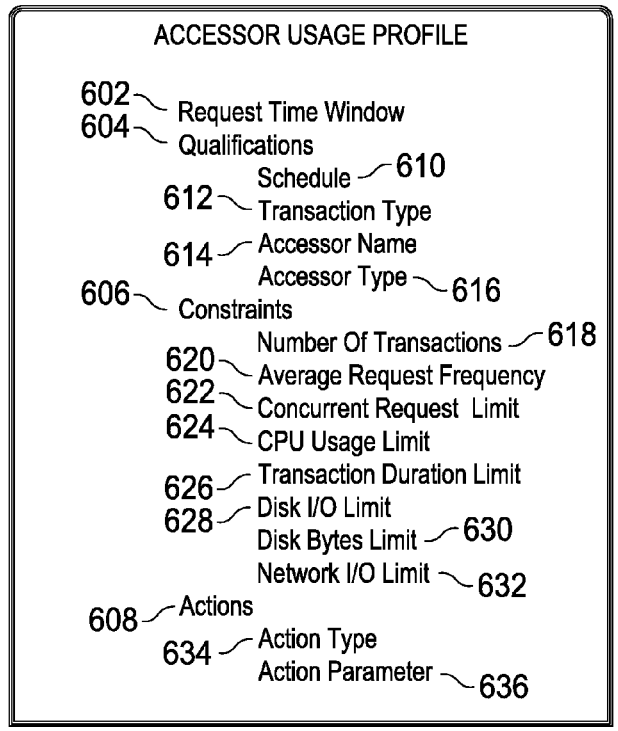
FIG. 6 illustrates a representative format of an accessor usage profile according to this disclosure.

The profiles provide a generalized characterization of legitimate behavior to be defined for each of an arbitrary set of accessor classes along with a set of actions to be taken in the event an accessor exceeds these limits. In one embodiment, the profiles are defined as a set of XML-encoded data sets contained in a text file. FIG. 6 illustrates a representative profile. A profile 600 typically comprises the following set of information, e.g., encoded as ASCII string values): a request time window 602, one or more qualifications 604, one or more constraints 606, and one or more actions 608. A request time window 602 is a period of time request usage is accumulated over to apply the one or more constraints defined in the profile. Typically, a request time window is a relatively small number of minutes to avoid excessive data accumulation, although there is no limit to the request time window. A qualification 604 may have one or more different attributes, such as schedule 610, transaction type 612, accessor name 614, and accessor type 616.

A schedule 610 constrains application of the profile to certain times of day, or to certain days, or the like. Typically, a schedule is composed of zero or more day/time windows of the form: start day/time and end day/time. If more than zero day/time windows are provided, the profile preferably is only enforced for the defined windows.

The transaction type 612 preferably is a list that includes all transactions by default. The list may include transactions defined, for example, by a set of internal transaction codes, by system-supplied codes, or by other identifiers. If a list is specified (e.g., by a set of internal transaction codes) and a given transaction is not contained in the list, preferably the profile is not applied to that transaction. The accessor name 614 preferably is a list of zero or more accessor names. If specified, preferably only transactions with matching accessors are considered. The accessor type 616 is a list of zero or more accessor types. If specified, preferably only transactions with matching accessor types are considered.

The one or more constraints 606 may be of several different types as well. The number of transactions 618 defines a maximum number of transactions permitted. If non-zero, preferably the constraint is triggered if more than this number of qualified transactions is attempted during the request time window 602. An average request frequency 620 preferably is measured by using a termination time of a previous transaction to a start time of a next transaction. This metric is used to prevent an accessor from gaining an advantage by submitting long-running transactions. Preferably, an average time is used in favor of an absolute inter-transaction time to prevent an accessor from using simple pauses to prevent constraint triggering. A concurrent request limit 622 defines how many concurrent requests a given accessor may have. A CPU usage limit constraint 624 defines a total CPU usage, preferably in milliseconds, that an accessor may utilize in the request time window. A transaction duration limit 626 defines a total request processing duration limit, preferably in milliseconds, across all requests in the request time window that an accessor is allowed. A disk I/O limit 628 defines a total number of disk I/O operations (e.g., reads and writes) across all requests in the request time window that an accessor is allowed. A disk byte limit 630 defines a total number of disk bytes (read and written, preferably in KB) across all requests in the request time window that an accessor is allowed. A network I/O limit 632 defines a total number of network bytes, preferably in KB, sent and received across all requests in the request time window an accessor is allowed. These constraints are merely representative, and functions (e.g., Boolean or other operations) that combine one or more may be configured. In addition, while the one or more constraints preferably operate within the applicable request time window, one or more constraints may be tied to occurrence of a given additional condition or occurrence.

The one or more actions 608 may include action types 634, and action parameters 636. An action type 634 is an action to return if a constraint in the profile is triggered (fired). Preferably, the action is read from the profile and returned by default without interruption. An action parameter 636 (e.g., a number of seconds to delay for an accessor delay action type) is applied to an action type. Preferably, the action parameter is also returned from the profile without interruption.

Preferably, a user interface includes a configuration tool (e.g., a network-accessible set of pages) by which a permitted user configures a profile. There may be a set of default profiles for one or more use case scenarios, and a particular tenant may have access to different set(s) of profile templates depending, for example, on the customer's status (e.g., gold, silver or bronze level). Certain fields in a profile template may be masked or inaccessible for certain types of customers. Thus, there may be different profile templates that are accessible for different users, such as tenants, tenant prospects, other third parties, and the like. A profile may be static or dynamic, and it may be pre-configured or configured manually, automatically or programmatically.

Figure 7:
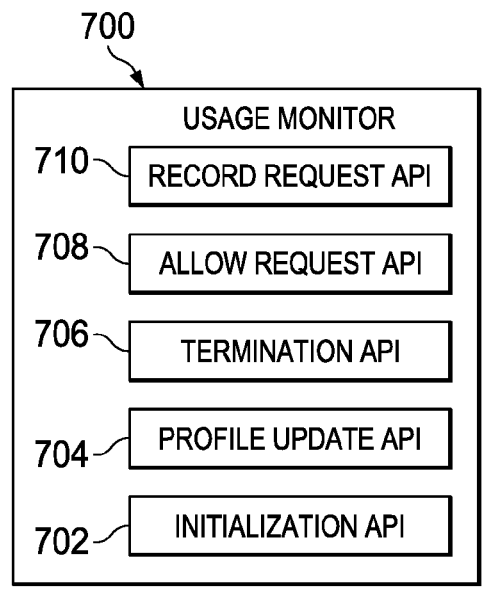
FIG. 7 illustrates a block diagram of a usage monitor sub-system according to this disclosure.

FIG. 7 illustrates a representative usage monitor 700. Preferably, the usage monitor provides a set of APIs that include the following: initialization 702, profile update 704, termination 706, allow request 708, and record request 710. The initialization API 702 causes the usage monitor to be initialized. Upon initialization, preferably the usage monitor reads all profiles that have been configured and/or are retrieved to the usage monitor. The update profile API 704 causes all profiles to be re-read and to become current. The termination API 706 terminates the usage monitor. The allow request API 708 receives as inputs one or more of the following: accessor name 614, accessor type 616 and transaction type 612; preferably, the allow request API 708 returns the corresponding action type 634 and action parameter 636. Preferably, and as will be described in more detail below, the allow request API 708 is called before every accessor request is processed. During this processing, the usage monitor checks the applicable constraints for the profile at issue and, if any constraint fires, the API returns the corresponding action type and action parameter to allow the calling application to respond as it determines is appropriate (or as the system may pre-configure or predetermine). The record request API 710 receives as inputs one or more of the following: accessor name 614, accessor type 616, transaction type 612, a duration in milliseconds (representing the transaction duration), CPU milliseconds (representing CPU usage consumed during the transaction), disk I/Os (representing disk I/Os occurring during the transaction), disk bytes (representing disk bytes consumed during the transaction), and network bytes (representing network I/O consumed during the transaction). Preferably, the record request API 710 is called after every accessor request completes. This API should be called if the allow request API was called previously for the same request.

The profile and usage monitor framework is not limited to enforcing a single fixed profile per accessor. As noted above, a given profile may differ from another profile with respect to one or more of the following: request time window, qualification(s), constraint(s), or action(s). Further, more than one profile may be applied to a given accessor and/or applied to an accessor for a given time interval. For example, there may be different levels of constraints applied for shorter durations (e.g., a few seconds) versus longer durations (e.g., an hour). Or, different actions may be applied to different limits. If a constraint in more than one profile fires for an accessor, the action type (and corresponding action parameter, if any) returned preferably is a highest one (in an ASCII sort order for example). This type of flexibility enables applications that use the usage monitor (and its APIs) a simple and effective way to create levels of action types without the usage monitor having to interpret/manage them.

The usage monitor (or an instance thereof) may be implemented in software (as a computer program) executing in a hardware processor. One or more data structures associated therewith store the profiles or data therein. A database may be used to store profile data in any convenient manner. In one embodiment, the profile data and the profiles are stored in a hash table that is keyed by an accessor identifier (e.g., accessor name/accessor type) with zero or one entry per key. A linked list (with a first entry being the oldest) may then be associated with each accessor entry in the hash table, with one for every request that has been processed by the accessor within the request time window whether complete or still being processed. The hash table may be periodically updated (e.g., by a background daemon) to remove accessors from the table, to thereby maintain the size of the table manageable for use in a working memory.

Preferably, the one or more action(s) performed when a constraint is fired will depend on the application. This is a not a limitation, as there may be a pre-configured or pre-defined set (or sequence) of actions that are system-imposed. The service provider may provide the tenant with a set of default action(s) or action sequences, or certain action(s) or action sequences may be imposed on the consuming application(s) by default, manually, automatically or programmatically. Typically, an application has a defined set of one or more actions. The actions may be implemented all at once, or in some predefined or configurable sequence. One such sequence that may be implemented by a consuming application may be as follows: generating a warning email to the accessor, generating a warning email to a defined tenant administrator, delaying access in real-time to some cloud resource (with optional delay interval returned), return a failure to the accessor, temporarily suspend accessor (with optional suspend interval returned), and permanently suspending accessor (subject to manual reinstatement). Of course, other sequences (or no sequence) may be configured and instantiated. The particular sequence may also be specified in the profile.

The mechanism of this disclosure may be implemented with respect to a single hosted application, or across multiple such applications (operating within the cloud environment concurrently). Typically, at least first and second tenants will use different profiles (because the end user use requirements are likely to differ).

Figure 8:
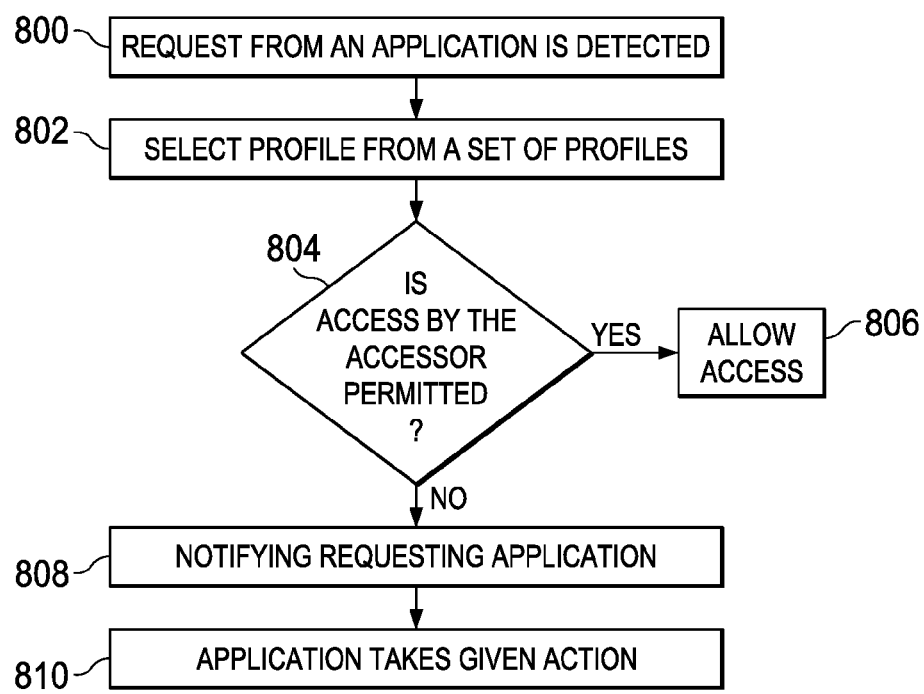
FIG. 8 illustrates a process flow of the usage monitor sub-system in FIG. 6 in a representative embodiment.

FIG. 8 illustrates a representative process flow for the usage monitor. As noted above, typically there will be multiple instances of the usage monitor, perhaps one per hosted application. The process assumes that profiles are defined and the usage monitor initialization API has been called. At step 800, a request for the application is detected. The request includes an identifier associated with a requesting user. Based on the request type or the identifier, and preferably before the request is processed in the cloud system, a profile of the set of profiles is selected at step 802. As noted above, the profile defines an allowed amount of access over a given time period (the request time window), typically for a given transaction type. What constitutes an allowed "amount of access" typically will vary for each profile, and it is defined by the particular constraint or constraints set forth in the applicable profile. At step 804, a test is performed to determine whether the accessor is permitted to access the application (e.g., based on the one or more constraints in the selected profile, a recent user history for the accessor, etc.). If the outcome of the test at step 804 indicates that the user should be permitted access (because some constraint in the profile is not yet triggered), the routine continues at step 806 to allow the request. As described above, the constraint may be of various types including, without limitation, number of transactions, average request frequency, concurrent requests, transaction duration, etc. If, however, the outcome of the test at step 804 is negative, the requesting application is notified at step 808, using the action data specified in the profile. At step 810, the application takes a given action based on the action data returned, and the process terminates with respect to the request. As noted above, in one embodiment, the action taken by the application may be issuing an escalating set of warnings that a usage is approaching a usage threshold in the profile.

The approach herein is quite flexible and may have numerous variants. Thus, for example, the decision regarding which particular profile to select from the set of profiles may depend on an identity or, or some other characteristic associated with, the particular tenant, or a determination of which tenant a particular accessor is associated. The approach also preferably includes a configuration management sub-system (or leverages an existing one in the cloud infrastructure) to add new profile(s) or to add new types of profile constraints as different or new types of applications or accessors start to use the infrastructure. The management sub-system may also provide for the specification and enforcement of actions to prevent or mitigation resource over-utilization other than just providing an escalating set of actions (such as described above). Other actions may include, without limitation, pushing requests into a waiting queue before allowing access, restricting a number of self-service trials, restricting access from a given number of indirect users (i.e., those that third parties who use products through the hosted application), and the like.

The profile generation and usage monitoring functions be part of an existing cloud management functionality (e.g., BSS, OSS, or other directory service), or they may be an extension or adjunct to some other cloud function, operation or mechanism. In operation, when the denial-of-service attack mechanism receives an indication that accessor user is attempting to take an action at a first cloud service despite the firing of an applicable profile constraint, the mechanism notifies the consuming application to take one or more actions, or one or more actions may be taken by the service itself.

The techniques described herein provide significant advantages over the prior art by preventing application-level denial-of-service attacks in a multi-tenant collaborative SaaS system. Using the approach, legitimate users and usage of the service may continue with acceptable response time and transaction throughput rates. The approach further ensures that denial-of-service attacks do not lead to rejection of service for legitimate users or otherwise create business-impacting support situations. The techniques enable detection and prevention of abusive usage of cloud resources, as well as prevention of subsequent denial-of-service attempts by intentional abusers. The mechanism is dynamic and can readily adapt to new behaviors (both good and bad), and it is flexible and thus able to allow for new, specifically allowable use cases (e.g., when an application in the SaaS business decides to allow certain behavior). In summary, the approach herein thus provides a general service to allow applications to avoid abuse of their service in the context of a collaborative, multi-tenant SaaS system.

Using Parametric-Sensitive Transaction Weighting

The techniques described above provide a valuable way to protect online multi-user systems and, in particular, by virtue of imposing limitations on requests from specific individuals or sessions using a variety of potential metrics. As has been described, the approach provides for a way to generate profiles that characterize legitimate behavior, and a given profile can be customized, e.g., by time of day, transaction and accessor types, usage constraints, and action parameters. The generalized approach assumes that there are sufficient levels of controls in place to achieve the desired goals, but in practice this may not always be the case. Thus, for example, some systems may not have the ability to track operation system and hardware metrics for individual users. In such circumstances, typically it is more convenient and straightforward to leverage transaction counts and types. Even then, however, leveraging just high level transaction-based data may prove difficult due to the widely-varying cost of execution of different transactions and, as important, the fact that those different transactions often are dependent on the input parameters specified by those transactions. Indeed, in many operating scenarios, application programming interfaces (APIs) vary dramatically based on what information is being requested with respect to a transaction.

To address the problem of profile generation and enforcement in this context, the technique herein provides a more fine-grained level of control, which for illustrative purposes is referred to herein as "parametric-sensitive transaction weighting." This nomenclature is not intended to be taken as limiting but, rather, simply refers to the general notion that transactions, rather than being simply counted (as one form of usage constraint for example), also have "weights" associated with them. Typically, the weights comprise positive integer values that are not bounded (or, at most have bounds in the range 0 to $2^{64}$). Further, and according to this approach, preferably a transaction weight is "parameterized" by one or more parameters using a "weighting function." The weighting function is a formula having variables that correspond to the one or more parameters. Typically, there is a weighting formula corresponding to a given transaction or transaction type. For example, a system may provide a transaction that performs a search based on time; as such, the amount of data that may need to be searched in the system and the amount of data that may need to be returned is highly variable. A formula based on the temporal distance between the current time and a provided starting search time parameter might then comprise the weighting function for this transaction.

Generalizing, and depending on the parameter values, a given weighting function associated with a transaction weight evaluates to a value that then is applied as a positive or negative adjustment to the transaction weight. The result is the parametric-sensitive transaction weighting. In this approach, the constraints in a usage profile comprise one or more transactions, with at least one of the transactions being weighted according to a weighting function defined by one or more parameters. When the usage profile includes multiple parametric-sensitive transaction weightings, the transaction weights (one or more of which are adjusted by their associated parameters through the weighting formula) are summed to provide an overall usage constraint.

The particular weights that are applied to the transactions, and the particular weighting function(s) that are used to parametrize the weights, are not a limitation of this disclosure.

According to this disclosure, the "usage constraint" 606 in the accessor usage profile (FIG. 6) described above is augmented to include one or more parametric-sensitive transaction weightings. As noted above, typically an accessor usage profile will include multiple transaction weighting of this type, such that the overall constraint is then the sum (or some other function) of the individual transaction weights. The parametric-sensitive transaction weightings may supplement the other constraints, or they may be used in lieu of those other constraints when necessary (e.g., when the high level transaction-based data such as simple transaction counts) do not provide the appropriate or desired level of control.

As noted above, the "weighting function" applied to a given transaction or transaction type may vary. Because the one or more parameters associated with the function provide an indication of the "cost" that executing the transaction imposes on the system resources, the notion is sometimes referred to herein as a "cost-based weighting function" whose value depends on the respective one or more parameters associated with the transaction represented by the function. When the cost involves "time," the weighting function may be considered to be a "time-based weighting function." The following describes representative examples of how parameters in transactions impact cost. The notion of "cost" here may refer to processing or memory cost, timing, economic value, or the like. A first example, is a database search transaction, which has a parameter for the start time for the request. According to this transaction, all documents that have been created or modified since that time are returned in the result set. In this example, the weighting function is a formula that allows cost to be calculated based on the time difference between the parameter "now" and this time would then be a heuristic for transaction cost. When the formula is parametrized with real values, the resulting transaction weight is adjusted accordingly. A second example is a directory search transaction that has a string search parameter, and there is an option that allows for the search to enable a prefix (instead of an exact) match. When searching a large directory, passing in a general value (e.g. "M") costs significantly more than passing in more characters (e.g., "Madagascar") because many more results are returned on the former string. A weighting function that takes the string search parameter length value into consideration may then be used to adjust the transaction weighting appropriately to reflect the true cost of executing the transaction. Other transaction examples include, without limitation, transactions that delete a list of documents given their identities (cost being determined by a number of documents in the list parameter), transactions that copy a list of documents given their identifiers (cost being determined by the number of documents in the list parameter), transactions that copy a list of documents given their identifiers (cost being determined by the number of documents in the list parameter), and many others. As noted above, the techniques of this disclosure are not limited to particular transactions or weights or weighting functions.

The parametric-sensitive transaction weightings may be pre-configured or static, e.g., based on expected or common parameters, or dynamic. As transaction requests are processed by the system, the "results" of executing those transactions may also act as feedback to further adjust a given transaction weight that is then applied going forward. Thus, according to this further aspect, transaction requests by tenant are processed according to an expected time-based weighting determined from parameters in the transaction requests to generate the parametric-sensitive transaction weight constraint for the accessor (tenant) usage profile. As noted above, each transaction in the profile can have its associated weighting, with an overall transaction constraint then represented by the sum (or some other function) of the individual weights.

The inclusion of parametric-sensitive transaction weights in this manner does not change the basic operation of the system previously described. Thus, overall denial-of-service prevention mechanism shown in FIG. 5 works in the same manner. In this embodiment, the profile generator subsystem 502 may be modified to include a further user interface display panel to configure the weighting function. The accessor usage profile in FIG. 6 is just modified to include an additional constraint 606 corresponding to the one or more parametric-sensitive transaction weights, and/or some function (e.g., the sum) of those weights representing multiple transactions. In FIG. 7, usage monitor 700 includes the same set of application programming interfaces (APIs) depicted, except that the allow request API 708 is modified to also check the applicable transaction weighted constraints for a usage profile when that profile is called in response to an accessor request. The profile update API 704 may also be modified to update the accessor usage profile to modify the transaction weightings when the above-described feedback approach is used. Further, the generalized process flow shown in FIG. 8 also still applies.

The technique herein provides significant advantages. The approach enables the widely-varying cost of execution of different transactions as a control factor in determining how the usage monitor executes. A more fine-grained degree of application-level control to avoid denial-of-service is thereby enabled, even when the tracking systems do not have the ability to track operation system and hardware metrics for individual users.

One or more aspects of the described functionality described above may be implemented as a standalone approach, e.g., a software-based function executed by a processor, although the preferred implementation is as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The subject matter herein may be a system, a method, and/or a computer program product at any possible technical detail level of integration. The computer program product may include a computer readable storage medium (or media) having computer readable program instructions thereon for causing a processor to carry out aspects of the disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the disclosed subject matter may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the disclosed subject are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the disclosed subject matter. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any cloud datacenter resource may host denial-of-service mechanism or its components as described herein.

In a representative embodiment, the denial-of-service mechanism is implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

Further, the usage tracking and denial-of-service functionality provided herein may be implemented as an adjunct or extension to an existing cloud compute management solution.

The techniques described herein may be used in any virtual client-server environments.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, cloud management systems and environments, as well as improvements to the functioning of denial-of-service prevention mechanisms within such systems and environments.

Having described our invention, what we now claim is as follows.

I claim:

1. A method of preventing application-level denial-of-service with respect to compute resources in a multi-tenant shared infrastructure, wherein a set of tenant applications available in the multi-tenant shared infrastructure are accessible by one or more accessors, comprising:

upon receipt from an accessor of a request to access a given application in the multi-tenant shared infrastructure, selecting a given usage profile from a set of usage profiles, the given usage profile including a usage constraint that, for a given transaction identified in the usage constraint, has an associated parametric-sensitive transaction weighting that is computed by (i) associating a weight to the given transaction, (ii) parameterizing the transaction weight according to at least one parameter using a weighting function, the weighting function associated with a given transaction type that includes the given transaction, (iii) evaluating the weighting function to a value; and (iv) adjusting the weight according to the value;

applying the usage constraint in the selected usage profile to determine whether the request to access the given application should proceed;

when permitting the request to access triggers the usage constraint in the selected usage profile, taking a given action, wherein the given action restricts one or more subsequent requests to access the given application by the accessor until a predetermined threshold of usage as defined by the usage constraint is no longer met.

2. The method as described in claim 1 wherein the weight associated with the given transaction is distinct from a transaction count.

3. The method as described in claim 1 wherein the usage constraint includes one or more additional parametric-sensitive transaction weightings for one or more respective transactions also included in the given usage profile.

4. The method as described in claim 3 wherein the usage constraint is a function of the parametric-sensitive transaction weightings in the given usage profile.

5. The method as described in claim 1 further including tracking one or more requests to access the given application and, in response to one or more results obtained from the tracking, adjusting the associated parametric-sensitive transaction weighting.

6. The method as described in claim 1 wherein the parametric-sensitive transaction weighting for the given transaction is an unbounded positive integer.

7. Apparatus, comprising:

a processor;

computer memory holding computer program instructions executed by the processor to prevent application-level denial-of-service with respect to compute resources in a multi-tenant shared infrastructure, wherein a set of tenant applications available in the multi-tenant shared infrastructure are accessible by one or more accessors, the computer program instructions comprising:

program code operative upon receipt from an accessor of a request to access a given application in the multi-tenant shared infrastructure to select a given usage profile from a set of usage profiles, the given usage profile including a usage constraint that, for a given transaction identified in the usage constraint, has an associated parametric-sensitive transaction weighting that is computed by (i) associating a weight to the given transaction, (ii) parameterizing the transaction weight according to at least one parameter using a weighting function, the weighting function associated with a given transaction type that includes the given transaction, (iii) evaluating the weighting function to a value; and (iv) adjusting the weight according to the value;

program code to apply the usage constraint in the selected usage profile to determine whether the request to access the given application should proceed; and program code to take a given action when permitting the request to access triggers the usage constraint in the selected usage profile, wherein the given action restricts one or more subsequent requests to access the given application by the accessor until a predetermined threshold of usage as defined by the usage constraint is no longer met.

8. The apparatus as described in claim 7 wherein the weight associated with the given transaction is distinct from a transaction count.

9. The apparatus as described in claim 7 wherein the usage constraint includes one or more additional parametric-sensitive transaction weightings for one or more respective transactions also included in the given usage profile.

10. The apparatus as described in claim 9 wherein the usage constraint is a function of the parametric-sensitive transaction weightings in the given usage profile.

11. The apparatus as described in claim 7 wherein the computer program instructions further include program code to track one or more requests to access the given application and, in response to one or more results obtained from the tracking, adjust the associated parametric-sensitive transaction weighting.

12. The apparatus as described in claim 7 wherein the parametric-sensitive transaction weighting for the given transaction is an unbounded positive integer.

13. A computer program product in a non-transitory computer readable medium for use in a data processing system, the computer program product holding computer program instructions which, when executed by the data processing system, prevent application-level denial-of-service with respect to compute resources in a multi-tenant shared infrastructure, wherein a set of tenant applications available in the multi-tenant shared infrastructure are accessible by one or more accessors, the computer program instructions comprising:

program code operative upon receipt from an accessor of a request to access a given application in the multi-tenant shared infrastructure to select a given usage profile from a set of usage profiles, the given usage profile including a usage constraint that, for a given transaction identified in the usage constraint, has an associated parametric-sensitive transaction weighting that is computed by (i) associating a weight to the given transaction, (ii) parameterizing the transaction weight according to at least one parameter using a weighting function, the weighting function associated with a given transaction type that includes the given transaction, (iii) evaluating the weighting function to a value; and (iv) adjusting the weight according to the value;

program code to apply the usage constraint in the selected usage profile to determine whether the request to access the given application should proceed; and program code to take a given action when permitting the request to access triggers the usage constraint in the selected usage profile, wherein the given action restricts one or more subsequent requests to access the given application by the accessor until a predetermined threshold of usage as defined by the usage constraint is no longer met.

14. The computer program product as described in claim 13 wherein the weight associated with the given transaction is distinct from a transaction count.

15. The computer program product as described in claim 13 wherein the usage constraint includes one or more additional parametric-sensitive transaction weightings for one or more respective transactions also included in the given usage profile.

16. The computer program product as described in claim 15 wherein the usage constraint is a function of the parametric-sensitive transaction weightings in the given usage profile.

17. The computer program product as described in claim 13 wherein the computer program instructions further include program code to track one or more requests to access the given application and, in response to one or more results obtained from the tracking, adjust the associated parametric-sensitive transaction weighting.

* * * * *